United States Patent [19]

Kano et al.

[11] Patent Number: 5,699,214
[45] Date of Patent: Dec. 16, 1997

[54] MAGNETIC INFORMATION DETECTING APPARATUS

[75] Inventors: Hiroshi Kano; Kenji Katori; Kazuhiko Hayashi; Akihiko Okabe; Kiyoshi Kagawa; Atsuko Suzuki, all of Kanagawa, Japan

[73] Assignee: Sony Corporation, Tokyo, Japan

[21] Appl. No.: 665,353

[22] Filed: Jun. 17, 1996

Related U.S. Application Data

[63] Continuation of Ser. No. 272,823, Jul. 11, 1994, abandoned.

[30] Foreign Application Priority Data

Jul. 31, 1993 [JP] Japan ................................. 5-226599

[51] Int. Cl.$^6$ .......................... G11B 5/33; G11B 5/008; G01P 3/42
[52] U.S. Cl. ............... 360/113; 324/207.2; 324/207.21; 324/252; 338/32 R; 360/89
[58] Field of Search .......................... 360/113, 89, 110; 338/32 R; 324/207.2, 207.21, 252, 207.24; 73/DIG. 3

[56] References Cited

U.S. PATENT DOCUMENTS

| | | | |
|---|---|---|---|
| 2,476,110 | 9/1949 | Neufeld | 360/89 |
| 2,590,627 | 4/1952 | Lenehan | 360/89 |
| 2,655,561 | 10/1953 | Connell | 360/89 |
| 2,655,562 | 10/1953 | Clark | 360/89 X |
| 3,274,575 | 9/1966 | Koster | 360/113 |
| 4,593,209 | 6/1986 | Sloan | 307/419 |
| 5,450,106 | 9/1995 | Morioka et al. | 347/37 |

FOREIGN PATENT DOCUMENTS

| | | | |
|---|---|---|---|
| 0686064 | 9/1979 | U.S.S.R. | 360/110 |
| 0905854 | 2/1982 | U.S.S.R. | 360/113 |

Primary Examiner—Stuart S. Levy
Assistant Examiner—William J. Klimowicz
Attorney, Agent, or Firm—Hill, Steadman & Simpson

[57] ABSTRACT

A magnetic information detecting apparatus is disclosed including a recording medium in which magnetic information is recorded and a magnetic field detection unit for detecting the magnetic information, the magnetic field detection unit having its magnetic field detecting section formed of a magnetoresistive element or a Hall element, the magnetic field detecting section surrounding peripheries of the recording medium. The recording medium has a substantially circular cross section. The magnetoresistive element has a structure of an artificial multilayer film formed by alternately stacking a conductor layer and a magnetic layer. The magnetic field detection unit has a soft magnetic body for conducting a magnetic field to the magnetic field detecting section.

7 Claims, 5 Drawing Sheets

MAGNETIC INFORMATION DETECTING APPARATUS

This is a continuation of application Ser. No. 08/272,823, filed Jul. 11, 1994 now abandoned.

BACKGROUND OF THE INVENTION

This invention relates to a magnetic information detecting apparatus having a recording medium in which magnetic information is recorded and a magnetic field detection unit for detecting the recorded information. Particularly, it relates to a magnetic information detecting apparatus which can be suitably adapted for a magnetic position sensor for detecting a relative position of the recording medium and the magnetic field detection unit from the read-out magnetic information.

To convert changes in the magnetic field into electrical information in the magnetic information detecting apparatus, such as the magnetic position sensor, the following two methods have been known. According to a first method, a coil is wound around a high-permeability material as a core, to convert the changes in the magnetic field by electromagnetic induction. According to a second method, a recording medium and a magnetic field detection head are held in parallel at a constant distance from each other as in a usual hard disk drive unit, using a magnetoresistive element, such as a permalloy, to convert the changes in the magnetic field by magnetoresistive effects.

In the first method, since the permeability of the material used for the core determines the sensitivity, a material of high permeability is required. However, the high-permeability material which is presently available has a permeability of only several thousand at the maximum. It is therefore difficult to produce large signals and assure a high detection accuracy.

In the second method, though a higher sensitivity than in the first method can be expected, the distance between the recording medium in which the magnetic information is recorded and the magnetic field detection head is changed by dust intruding into the space between them. This change in distance causes fluctuation in signal output, which generates a noise, lowering the detection accuracy.

Meanwhile, an artificial multilayer formed by alternately stacking different kinds of metals by several atomic layers has been noted recently. Particularly, it is reported, in Physical Review Letters, vol. 66, 1991, page 2152, that an artificial multilayer formed by stacking a magnetic layer mainly consisting of Co and a conductor layer composed of Cu exhibits a large magnetoresistance effect exceeding 60%.

However, using the artificial multilayer as the magnetoresistive element for a magnetic field detecting section does not solve the problem of the lowering of the detection accuracy due to the fluctuation noise of the signal component caused by the dust intrusion into the space between the magnetic medium and the magnetic field detection head.

The above-described problem lowers the detection function of the apparatus for producing position information using the magnetic information detecting apparatus.

SUMMARY OF THE INVENTION

In view of the above-described status of the art, it is an object of the present invention to provide a magnetic information detecting apparatus which is capable of producing a high sensitivity and a high output.

It is another object of the present invention to provide a magnetic information detecting apparatus having such a structure that fluctuation in the signal component due to the dust and generation of a noise are unlikely to occur.

According to the present invention, there is provided a magnetic information detecting apparatus including a recording medium in which magnetic information is recorded and a magnetic field detection unit for detecting the magnetic information, the magnetic detection unit having a magnetic field detecting section composed of a magnetoresistive element or a Hall element, the magnetic field detecting section surrounding peripheries of the recording medium.

DETAILED DESCRIPTION OF THE INVENTION

Figure 1:
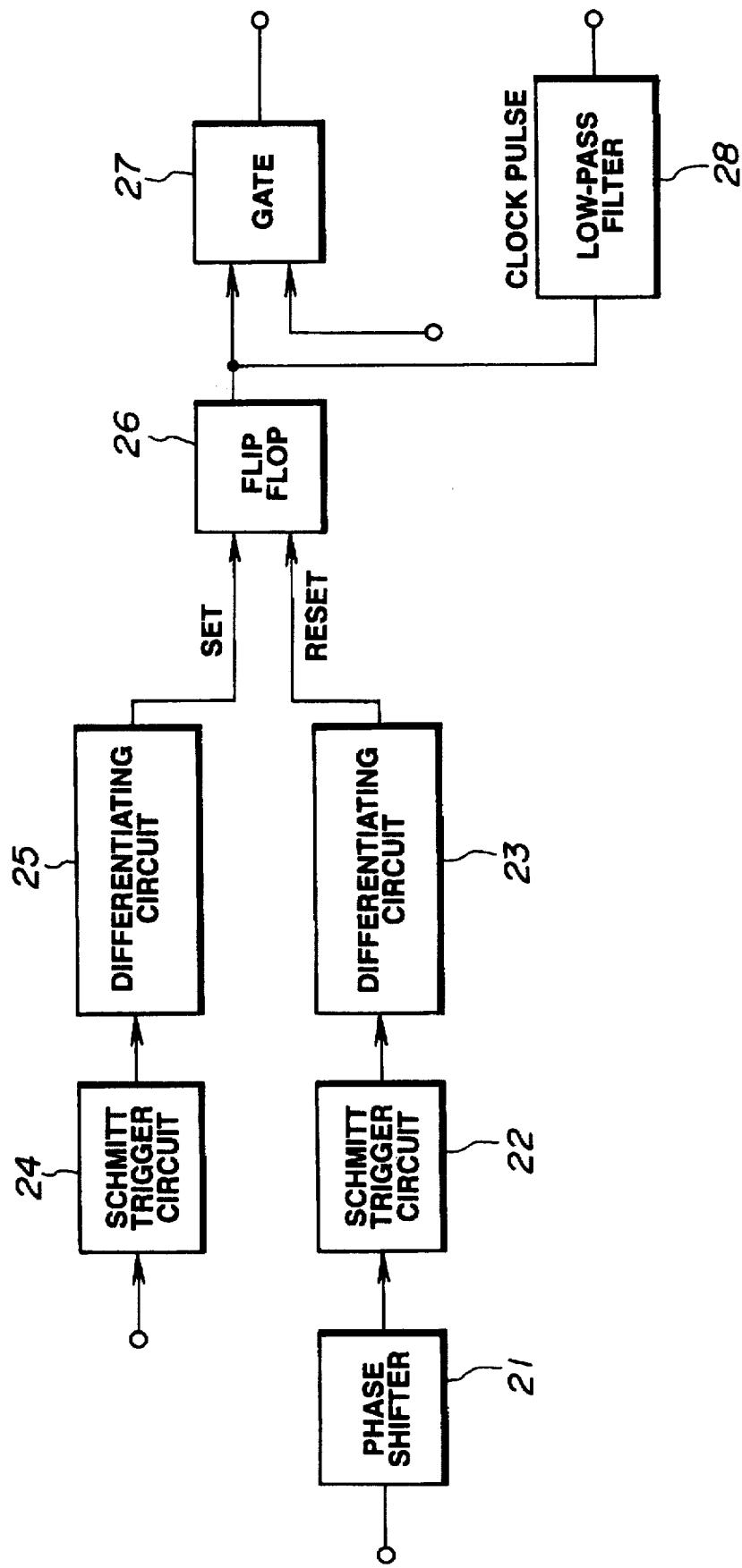
FIG. 1 is a circuit diagram showing an example of an interpolation circuit for obtaining resolution in a magnetic scale.

The magnetic information detecting apparatus of the present invention uses a magnetoresistive element or a Hall effect element, which is a highly sensitive signal detection unit, for a magnetic field detecting section to obtain a high sensitivity. When these elements are used, as dust contaminates the space between the recording medium and the magnetic field detecting section, fluctuating the distance between them, the fluctuation in the distance causes a noise in reproduction signals. Thus, according to the present invention, by having a structure in which the magnetic field detecting section surrounds peripheries of the recording medium having magnetic information recorded therein, substantially all around it, it is possible to prevent the dust from intruding into the space between the recording medium and the magnetic field detecting section, thus restricting generation of the noise.

Any known magnetoresistive element or Hall element can be used for the magnetic field detecting section. However, by using an artificial multilayer film formed by alternately stacking a conductor layer and a magnetic layer consisting mainly of Co as the magnetoresistive element, it is possible to obtain a higher sensitivity.

The magnetic information detecting apparatus of the present invention may have a single or a pair of the magnetic field detection units of the above structure. The apparatus may also have plural magnetic field detection units superposed on one another to collect signals from each magnetic field detecting section, to obtain a still higher sensitivity.

However, if the magnetic field detecting section is exposed to contact a hole through which the recording medium passes, the recording medium and the magnetic field detecting section may directly contact each other. If the plural magnetic field detection units are superposed, an overcurrent flowing between the magnetic field detecting sections through the recording medium destroys the element.

Thus, a soft magnetic body for introducing a magnetic field to the magnetic field detecting section including the magnetoresistive element or the Hall element is provided in the magnetic detection unit, so that a magnetic flux from the recording medium having magnetic information recorded therein is introduced through the soft magnetic body to the magnetic field detecting section. Thus, by slightly retracting the magnetic field detecting section from the hole and insulating the soft magnetic body and the magnetic field detecting section, it is possible to solve the problem of the short circuit.

The magnetic information detecting apparatus of the present invention can be applied in a variety of fields. For example, it is preferably applied to a magnetic position sensor, such as, a magnetic scale.

In application to the magnetic scale, any conventional circuit for position detection from the signal from the magnetic field detection unit can be employed.

For instance, by detecting a magnetization pattern having regular cycles on the magnetic scale using two magnetic field detection units of a channel 1 and a channel 2 spaced away at a distance of $(m+¼)\lambda$ of the recording wavelength ($\lambda$) and then adding both outputs, it is possible to produce a phase modulation signal which has a frequency twice as high as the exciting current and has its phase changed in proportion to the position of the magnetic field detection unit.

By comparatively measuring the phase difference between the phase modulation signal and the second harmonic of the exciting frequency, it is possible to detect an intermediate position in one wavelength $\lambda$.

In general, with the magnetic scale, interpolation is conducted with the following method, to found the amount of minimum display, that is, resolution. As shown in FIG. 1, the phase modulation signal is shaped into a rectangular wave through a phase shifter 21 and a Schmitt trigger circuit 22, and then a pulse is formed by a differentiating circuit 23. Also, the second harmonic of the exciting frequency is shaped into a rectangular wave through a Schmitt trigger circuit 24, and then a pulse is formed by a differentiating circuit 25.

As the pulse of the differentiating circuit 23 and the pulse of the differentiating circuit 25 are entered to a reset input and a set input of a flip flop 28, respectively, a pulse string of varying width as an output on the set side can be produced. The width is equal to the phase difference between the set and reset input signals of the flip flop 28. Therefore, by gating the clock pulse with a gate circuit 27 with this width and counting the number of pulses produced as the output, it is possible to digitally display the phase difference, that is, the intermediate position in one wavelength $\lambda$. At this point, by passing the output of the flip flop 26 through a low-pass filter 28, it is possible to produce a voltage in proportion to the phase difference, that is, the intermediate position in $\lambda$, which is then usable for an analog output or servo.

In the present invention, since the magnetoresistive element or the Hall element is used for the magnetic field detecting section, magnetic information can be detected with a high sensitivity.

Also, since the magnetic field detecting section surrounds peripheries of the recording medium substantially all around it, the dust is unlikely to intrude into the space between the recording medium and the magnetic field detecting section. Thus, the fluctuation in the signal output due to the change in distance and hence the generation of the noise can be restricted.

Preferred embodiments of the present invention will now be described in detail with reference to the accompanying drawings.

Embodiment 1

Figure 2:
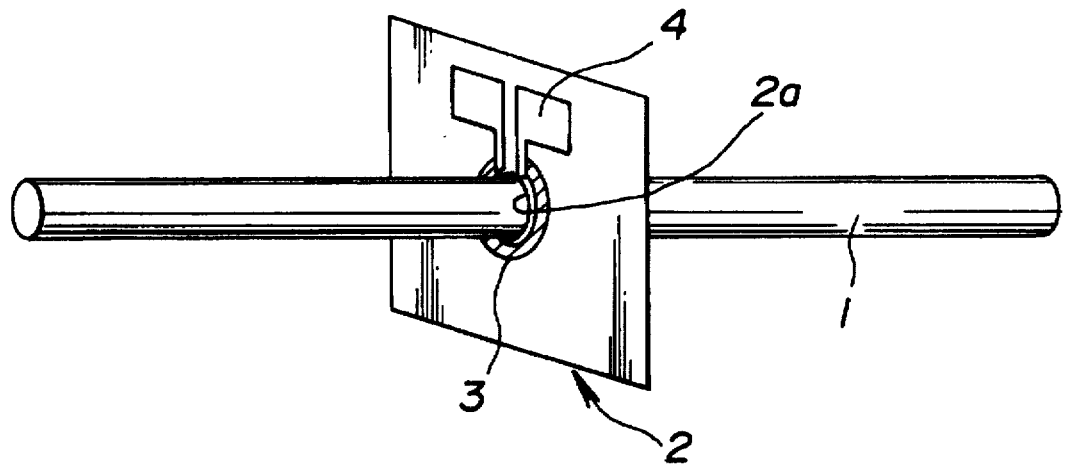
FIG. 2 is a perspective view showing an example of the structure of a magnetic information detecting apparatus according to the present invention.

FIG. 2 shows an example of a magnetic information detecting apparatus according to the present invention. In the present embodiment, a round bar of CuNiFe, 3 mm in diameter and 30 cm in length, was used as a recording medium 1 for recording information. Although a round bar having a circular cross section is preferred for its being easy to process, a bar of rectangular cross section may also be employed.

Magnetic information having a wavelength of 100 µm was recorded in the recording medium 1 in the longitudinal direction thereof with a recording head for normal magnetic tape recording.

Meanwhile, a magnetic field detection head 2 as the magnetic field detection unit has a hole 2a opened therein. The hole 2a has an inner diameter slightly greater than the outer diameter of the recording medium 1. By having the recording medium 1 inserted through the hole 2a and moving along the recording medium, the magnetic field detection head 2 detects signals. In the present embodiment, the hole 2a had a diameter of 3.05 mm.

Figure 3:
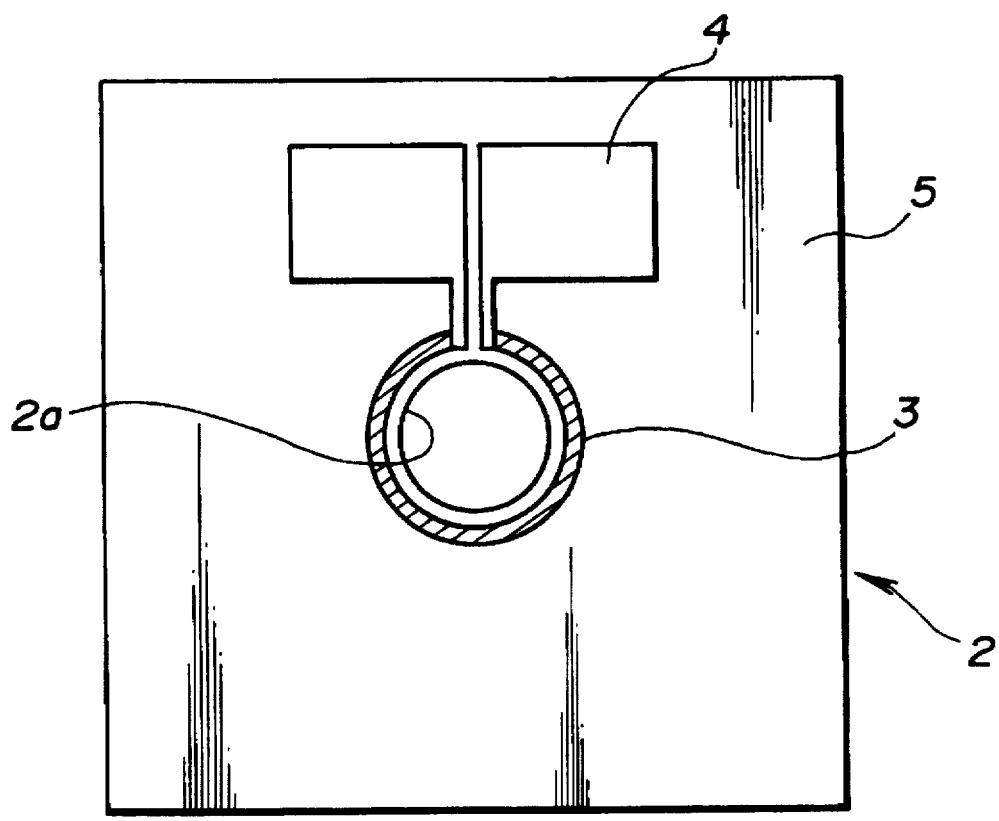
FIG. 3 is a plan view showing an example of a magnetic field detection head using a magnetoresistive element.

The magnetic field detection head 2 is shown in an enlarged view of FIG. 3. A magnetic field detection element 3 as the magnetic field detecting section was produced by forming a film of FeNi alloy or permalloy having magnetoresistance effects, 100 nm in thickness, on a substrate 5 using an electron beam heat-deposit device and processing the film so as to surround the outer periphery of the hole 2a with a photolithography technique.

The magnetic field detection element 3 has a part of its circumference cut off, where a film of Cu, 1 µm in thickness, formed by the electron beam heat-deposit device is electrically connected as an electrode 4. Thus, the magnetic field detection element 3 surrounding the outer periphery of the hole 2a carries a current for detecting signals, that is, a so-called sense current.

The magnetic field detection element 3 surrounding the circumference had a line width of 100 µm. The substrate 5 was formed of BeCu alloy, 50 µm in thickness, and had an $SiO_2$ film, 1 µm, formed as an insulation film on its surface by a sputtering device.

The reproduction output was measured by using the recording medium 1 and the magnetic field detection head 2. The output thus measured was 20 to 30 mV. To measure the fluctuation in the reproduction output due to the dust, an operation test was conducted for one hour in a place of a large amount of dust and particles. However, fluctuations in the output were not observed.

Figure 4:
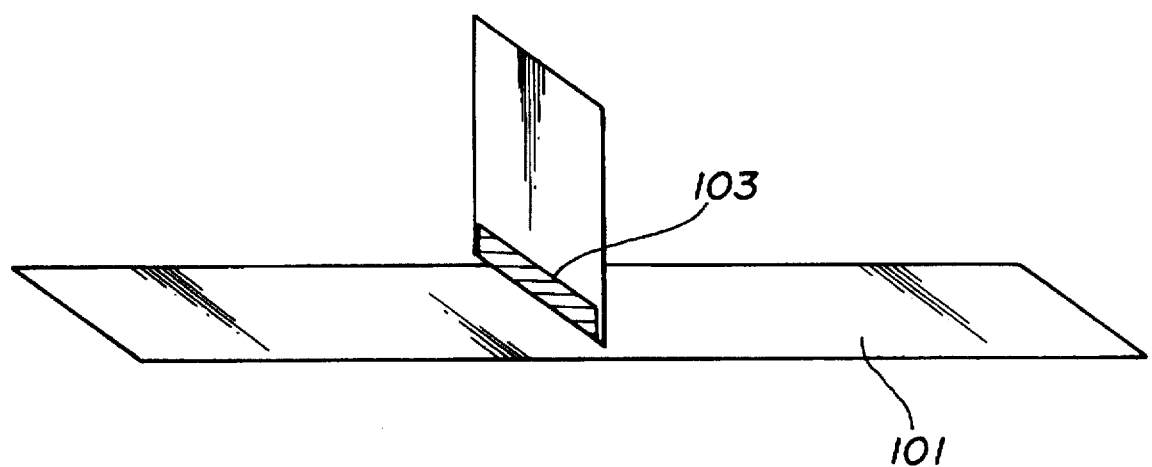
FIG. 4 is a perspective view showing an example of a conventional magnetic information detecting apparatus.

FIG. 4 shows a conventional magnetic field detection head made for comparison. The magnetic field detection head had the same structure as that of the above embodiment, except for having a recording medium 101 for recording information formed as a flat plate 20 mm in width and a magnetic field detecting section 103 in a linear shape 10 mm in length, 100 µm in width.

The initial reproduction output in this case was 20 to 30 mV, which is substantially the same as in the above embodiment. However, the output after the one-hour operation test in a place of a large amount of dust and particles was 5 to 20 mV, having a large fluctuation. Thus, the noise was generated.

From the above experiment, it has been found that the magnetic information detecting apparatus of the present invention has a higher detection accuracy.

Embodiment 2

A Hall effect element 8 of InGa alloy formed into a film 100 nm in thickness by the electron beam heat-deposit device was produced to be used as the magnetic field detection element, instead of the magnetic field detection element of FeNi or permalloy.

Figure 5:
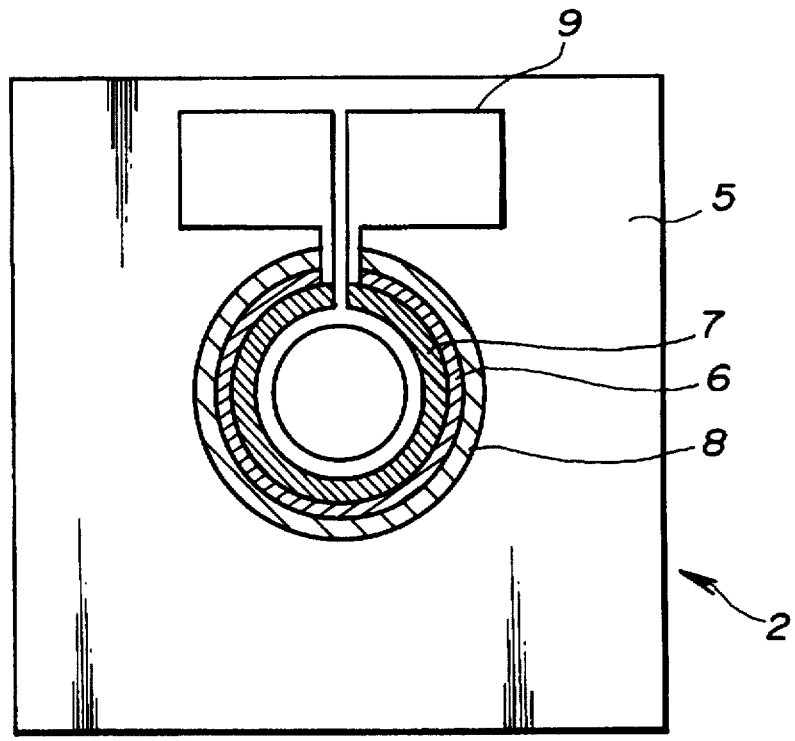
FIG. 5 is a plan view showing an example of a magnetic field detection head using a Hall element.

FIG. 5 shows a magnetic field detection head of the present embodiment. The Hall effect element 6 has an internal electrode 7 mounted on the inner side thereof and an external electrode 8 mounted on the outer side thereof. A bias current was caused to flow from the internal electrode 7 to the external electrode 8. The signal output was outputted from an output terminal 9 produced in a manner similar to Embodiment 1. Then, the signal output measured under the same conditions as in the Embodiment 1 was 25 to 35 mV. It has been thus found that a higher sensitivity and a higher detection accuracy can be obtained. Fluctuations in the output were not observed in the dust and particle test.

Embodiment 3

An artificial multilayer film was formed by alternately stacking a magnetic layer of CoFeNi alloy and a conductor layer of Cu for the use as the magnetoresistive element, instead of the magnetic field detection element of FeNi alloy or permalloy of Embodiment 1. The sputtering device was used to produce the magnetoresistive element formed of the artificial multilayer film.

The thickness of the CoFeNi alloy layer was 1 nm, and the thickness of the Cu layer was 2.2 nm. The stack cycle was set to 20. The signal output measured under the same conditions as in Embodiment 1 except for using the different material of the magnetic field detection element was 25 to 35 mV. It has been thus found that a higher sensitivity and a higher detection accuracy than Embodiment 1 can be obtained. Fluctuations in the output were not observed in the dust and particle test.

Embodiment 4

In the present embodiment, the magnetic field detection element was slightly retracted from the hole, and a soft magnetic body for conducting the magnetic field was provided in the magnetic field detection element. The magnetic field detection element was applied to a multi-gap head.

Figure 6:
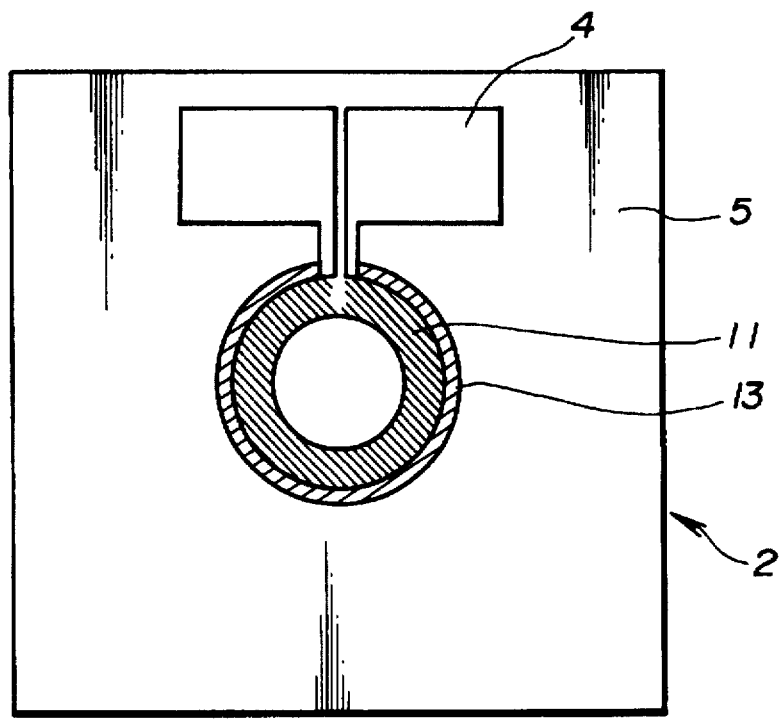
FIG. 6 is a plan view showing another example of the magnetic field detection head using the magnetoresistive element.
Figure 7:
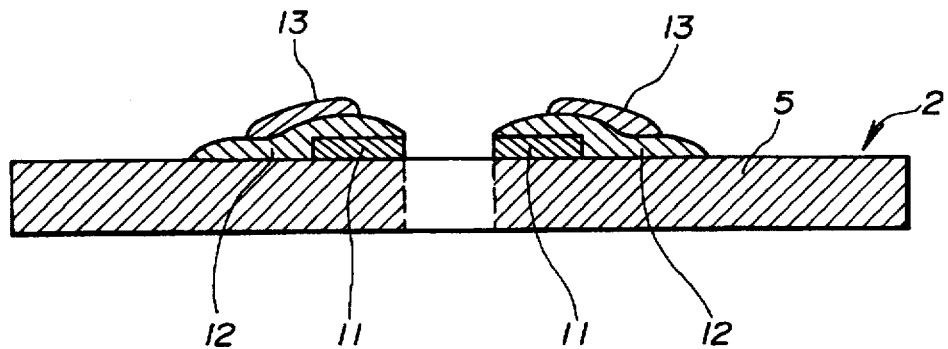
FIG. 7 is a cross-sectional view of the magnetic field detection head shown in FIG. 6.

FIG. 6 shows the structure of one magnetic field detection head of the present embodiment. FIG. 7 shows the cross section of it. On the periphery of the hole through which the recording medium passes, a film of FeNi alloy or permalloy 1 μm in thickness was formed as a soft magnetic body 11 for conducting the magnetic field to the magnetic field detection element, by using the electron beam heat-deposit device. On this FeNi alloy film, an $SiO_2$ film 1 μm was formed as an insulation layer 12 by the electron beam heat-deposit device. Furthermore, an artificial multilayer film similar to that of Embodiment 3 was formed as a magnetic field detection element 13 in a position 200 μm away from the hole through which the recording medium passes, on the insulation layer 12.

Figure 8:
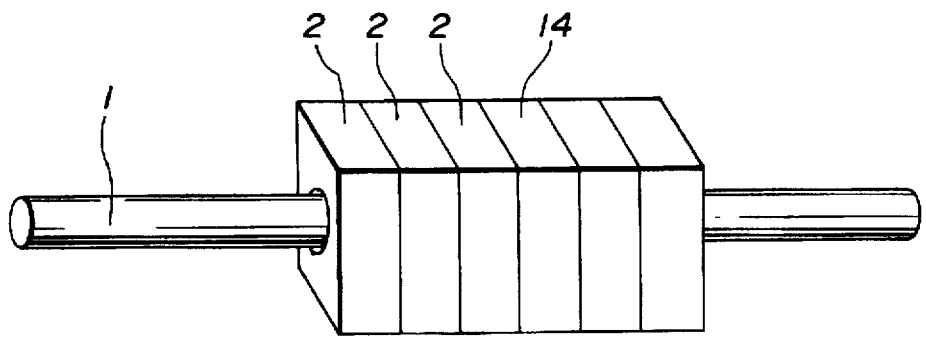
FIG. 8 is a perspective view showing an example of a multi-gap head.
Figure 9:
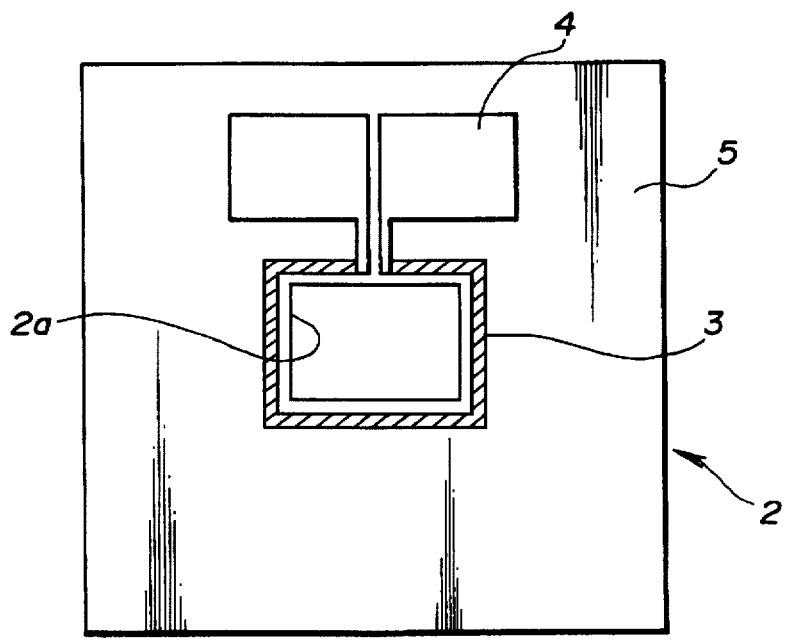
FIG. 9 is a plan view of another example of the magnetic field detection head.

20 of the magnetic field detection heads 2 were superposed and stacked on one another to form a multi-gap head 14. FIG. 8 shows the structure of the multi-gap head. The signal output measured under the same conditions as in Embodiment 1 using the multi-gap head 14 was 50 to 80 mV. It has been thus found that a higher sensitivity and a higher accuracy than in Embodiment 1 can be obtained. Fluctuations in the output were not observed in the dust and particle test. A short circuit between the magnetic field detection heads 2 was not generated, either.

As is clear from the above description, since the present invention uses the magnetoresistive element or the Hall element for the magnetic field detecting section, it is possible to detect magnetic information with a high sensitivity and thus to obtain a high detection accuracy.

In addition, since the magnetic field detecting section surrounds the peripheries of the recording medium, the dust is unlikely to intrude into the space between the recording medium and the magnetic field detecting section. Thus, it is possible to restrict the fluctuation in the signal output due to the change in distance and hence the generation of the noise.

What is claimed is:

1. A magnetic information detecting apparatus comprising:

a recording medium in which magnetic information is recorded, said recording medium having a longitudinal direction; and magnetic field detection means for detecting the magnetic information, the magnetic field detection means having a support with an opening through which said recording medium travels relative to said magnetic field detection means and a magnetic field detecting section formed on said support and being an element selected from the group consisting of a magnetoresistive element and a Hall element, said opening in said support being sized and shaped to closely conform about a transverse periphery of said recording medium so as to be effective to restrict passage of dust particles between an edge of said opening and said recording medium, the magnetic field detecting section comprising a loop substantially surrounding the entirety of said transverse periphery of the recording medium and a pair of electrical conductors electrically connected to said loop for providing an electrical current through said loop, said loop substantially conforming in shape to said transverse periphery of said recording medium except at a position wherein said loop is disjointed and resulting opposite ends of said loop are connected to respective ones of said electrical conductors, said loop being sufficiently spaced from said edge of said opening to avoid contact between said recording medium and said loop.

2. The magnetic information detecting apparatus as claimed in claim 1, wherein the magnetoresistive element has a structure of an artificial multilayer film formed by alternately stacking a conductor layer and a magnetic layer.

3. The magnetic information detecting apparatus as claimed in claim 1, wherein a plurality of the magnetic field detection means are superposed on one another.

4. The magnetic information detecting apparatus as claimed in claim 1, wherein the recording medium has a substantially circular cross section.

5. The magnetic information detecting apparatus as claimed in claim 1, wherein the magnetic field detection means has a soft magnetic body for conducting a magnetic field to the magnetic field detecting section.

6. The magnetic information detecting apparatus as claimed in claim 1, wherein the recording medium has a rectangular cross section.

7. The magnetic information detecting apparatus as claimed in claim 1, wherein a soft magnetic material body is provided between said loop and said edge of said opening in said support.

* * * * *